United States Patent [19]

Machida

[11] 3,997,823
[45] Dec. 14, 1976

[54] BRUSHLESS DC MOTOR DRIVING CIRCUIT

[75] Inventor: Yukihiko Machida, Mitaka, Japan

[73] Assignee: Sony Corporation, Tokyo, Japan

[22] Filed: Oct. 21, 1974

[21] Appl. No.: 516,383

[30] Foreign Application Priority Data

Oct. 30, 1973 Japan .......................... 48-121991

[52] U.S. Cl. ............................... 318/138; 318/254
[51] Int. Cl.² ....................................... H02K 29/00
[58] Field of Search ........................... 318/138, 254

[56] References Cited

UNITED STATES PATENTS

| | | | |
|---|---|---|---|
| 3,304,481 | 2/1967 | Saussele | 318/138 |
| 3,488,566 | 1/1970 | Fukuda | 318/138 |
| 3,504,252 | 3/1970 | Moczala et al. | 318/138 |
| 3,611,081 | 10/1971 | Watson | 318/138 |
| 3,829,749 | 8/1974 | Richt | 318/138 X |

*Primary Examiner*—Gene Z. Rubinson
*Attorney, Agent, or Firm*—Hill, Gross, Simpson, Van Santen, Steadman, Chiara & Simpson

[57] ABSTRACT

A brushless DC motor having a plurality of stator windings and a rotor made of a magnet is driven by energizing the stator windings successively, and in which signals induced in the plurality of stator windings resulting from the rotation of the rotor are detected as position signals of the rotor and at least one of the stator windings which corresponds to the position signal is supplied with a driving signal.

5 Claims, 7 Drawing Figures

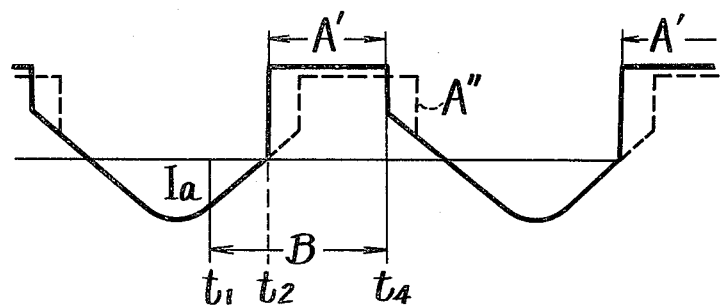
Fig. 3
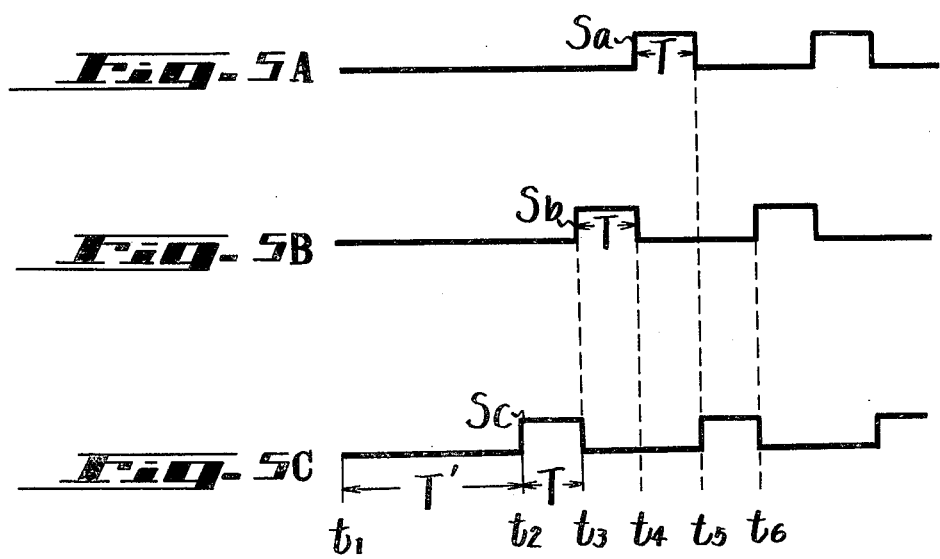
Fig. 5A
Fig. 5B
Fig. 5C 3,997,823

BRUSHLESS DC MOTOR DRIVING CIRCUIT

BACKGROUND OF THE INVENTION

1. Field of the Invention

The present invention relates generally to a brushless DC motor driving circuit, and more particularly to a brushless DC motor driving circuit which enables the DC motor to be simple in construction.

2. Description of the Prior Art

A brushless DC motor having a plurality of switching transistors has been already proposed. With such a prior art brushless DC motor, the rotating state, i.e., rotary phase, of the rotor of the motor is detected by a detecting element such as a magneto-sensitive element, a photo-sensitive element or the like, and a plurality of switching transistors are successively switched with the output from the detecting element, and a current is applied successively to a plurality of motor windings to rotate the rotor.

In such a prior art brushless DC motor driving circuit above described, it is troublesome to install the detecting element which detects the rotary phase of the rotor. Further, the rotary state of the rotor is influenced a great deal in accordance with the position-adjustment of the detecting element attached to the motor.

SUMMARY OF THE INVENTION

It is an object of the present invention to provide a novel brushless DC motor driving circuit.

It is another object of the present invention to provide a novel brushless DC motor driving circuit with no particular detecting element which is adapted to detect the rotary position of the rotor of the motor.

It is a further object of the present invention to provide a novel brushless DC motor driving circuit which can drive the motor in a satisfactory manner without any adjustment.

According to the present invention, there is provided a brushless DC motor which comprises a rotor consisting of a rotor made of a magnet and a stator formed of a plurality of fixed windings, a voltage source, switching means connected between the voltage source and a plurality of fixed stator windings for supplying driving currents to the plurality of fixed windings successively, first means for detecting signals induced in the plurality of fixed windings caused by rotation of the rotor as position signals, and second means for controlling the switching means in response to the position signals and for supplying the driving currents to at least one of the plurality of fixed windings which correspond to the position signal.

Other objects, features and advantages of the present invention will become obvious from the following description taken in conjunction with the accompanying drawings.

BRIEF DESCRIPTION OF THE DRAWINGS

FIGS. 2 and 3 are waveform diagrams used for explaining the operation of the motor shown in FIG. 1;

FIGS. 5A, 5B and 5C are waveform diagrams used for explaining the operation of the motor shown in FIG. 4.

DESCRIPTION OF THE PREFERRED EMBODIMENTS

A preferred embodiment of a brushless DC motor driving circuit according to the present invention will be hereinafter described with reference to the drawings.

Figure 1:
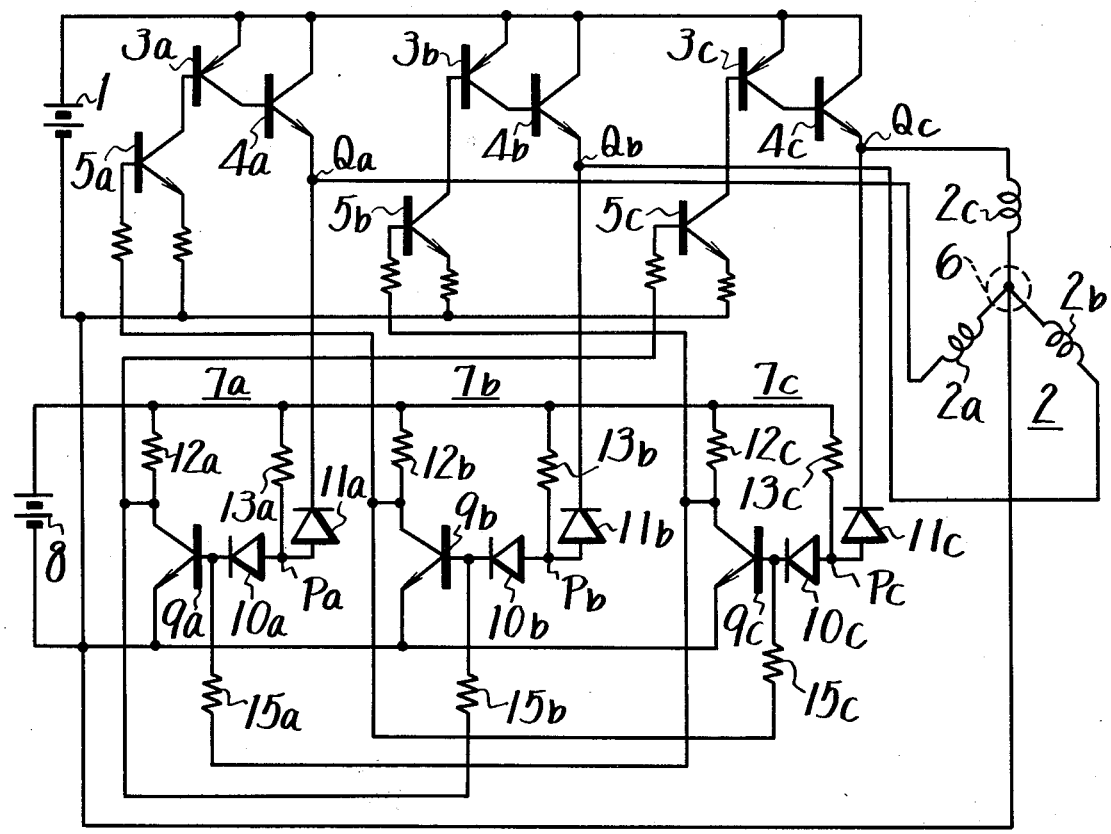
FIG. 1 is a connection diagram showing an embodiment of a brushless DC motor driving circuit according to the present invention.

FIG. 1 shows a first preferred embodiment of the brushless DC motor driving circuit of the present invention. In FIG. 1, reference numeral 1 indicates a DC voltage source, and $2a$, $2b$ and $2c$ fixed windings which form the stator of a motor 2. As illustrated, three fixed windings $2a$, $2b$ and $2c$ are employed, but any number of fixed windings may be used. The windings $2a$, $2b$ and $2c$ are arranged at equal angular distances with respect to the center of the motor 2. As shown, reference numerals $3a$, $4a$; $3b$, $4b$; and $3c$, $4c$ are pairs of complementary switching transistors, and $5a$, $5b$ and $5c$ are controlling transistors therefor. As the controlling transistors $5a$, $5b$ and $5c$ are made ON (or OFF) successively in response to a rotary position of a rotor 6 of the motor 2, the windings $2a$, $2b$ and $2c$ are successively supplied with currents from the DC voltage source 1 through the switching transistors $3a$, $4a$; $3b$, $4b$; and $3c$, $4c$, respectively, to rotate the rotor 6, which is similar to that of the prior art.

In the present invention, signals induced in the fixed windings $2a$, $2b$ and $2c$ in accordance with rotation of the rotor 6 are detected and then utilized as signals which show the rotary position of the rotor 6. The detected signals are used to control any one of the controlling transistors $5a$, $5b$ and $5c$ to supply a driving current to any of the fixed windings $2a$, $2b$ and $2c$ which corresponds to the rotary position of the rotor 6.

To this end, in the embodiment depicted in FIG. 1, there are provided logic circuits $7a$, $7b$ and $7c$ which are connected to a DC voltage source 8. In the illustrated embodiment, the logic circuit $7a$ is formed in such a manner that the collector-emitter path of a transistor $9a$ is connected through a resistor $12a$ to the voltage source 8; a circuit of a resistor $13a$, a diode $10a$ and the base-emitter path of the transistor $9a$ is connected to the voltage source 8; a connection point $Pa$ between the diode $10a$ and the resistor $13a$ is connected through a diode $11a$ to a connection point $Qa$ between the transistor $4a$ and the winding $2a$; and the collector of the transistor $9a$ is connected through a resistor to the base of the transistor which belongs to the winding $2b$ or $2c$ different from the winding $2a$ to which the logic circuit $7a$ belongs. As shown, this latter connection is to the base of the transistor $5c$. The other logic circuits $7b$ and $7c$ are formed similarly, so that descriptions on their construction will be omitted but the circuit elements are shown with the same reference numerals with letters $b$ and $c$ in place of $a$, respectively.

Figure 2:
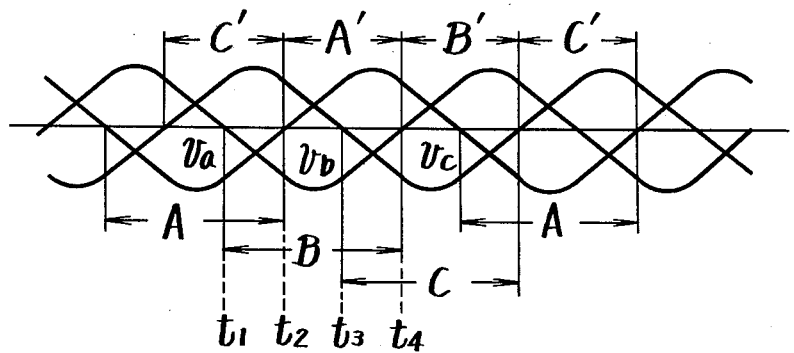

FIG. 2 shows voltage signal waveforms which are induced in the respective fixed windings $2a$, $2b$ and $2c$ of the motor 2 when the motor 2 is rotated externally. In FIG. 2, reference letters $Va$, $Vb$ and $Vc$ are voltage signals induced in the windings $2a$, $2b$ and $2c$, respectively. As may be apparent from the voltage waveforms of FIG. 2, during a time interval A the diode $11a$ is made ON; during a time interval B the diode $11b$ is made ON; and during a time interval C the diode $11c$ is made ON. Accordingly, in the embodiment of FIG. 1, the voltage $Va$ is detected as a position signal of the rotor 6 to thereby supply a driving current to the winding $2c$; the voltage $Vb$ is detected as a second position signal of the rotor 6 to thereby supply a driving signal to the winding 2a; and similarly the voltage Vc is detected to supply a driving current to the winding 2b, respectively. In this case, time intervals for the respective driving currents are selected such that the driving currents are prevented from being superposed one upon the other with respect to the windings 2a, 2b and 2c, as shown in FIG. 2. In FIG. 2, reference letters A'; B' and C' represent time intervals within which the driving currents are supplied, respectively. To this end, the collector of the transistor 9c is connected through a resistor 15a to the base of the transistor 9a, the collector of the transistor 9a is connected through a resistor 15b to the base of the transistor 9b, and the collector of the transistor 9b is connected through a resistor 15c to the base of the transistor 9c, as shown in FIG. 1.

The above operation will be now described as to the time interval B with reference to FIG. 2. From the beginning of the time interval B or a time $t_1$ the diode 11b is made ON by the voltage Vb and the transistor 9b is tended to be OFF. However, since the beginning portion of the time interval B overlaps with the terminating portion of the time interval A and, at the beginning of the time interval B, the diode 11a, is made ON with the voltage Va while the transistor 9a is still in OFF-state, the collector of the transistor 9a is of high potential which is applied to the base of the transistor 9b to make it ON. Therefore, the collector potential of the transistor 9b is low, so that the transistor 5a is in OFF-state, and accordingly, the transistors 3a and 4a are both in OFF-state. Thus, no current is applied to the winding 2a. At the termination of the time interval A or time $t_2$ the voltage Va disappears, so that the diode 11a is made OFF and the transistor 9a is made ON. Accordingly, the collector potential of the transistor 9a is lowered. At this time the voltage Vb is already induced, so that the transistor 9b is made OFF. Therefore, after the time $t_2$ during the time interval B, the collector potential of the transistor 9b becomes high and hence the transistor 5a is made On thereby. Thus, the transistors 3a and 4a are made ON to supply the current therethrough to the winding 2a from the voltage source 1.

When the time interval B terminates at a time $t_4$ (the time interval C already starts at a time $t_3$ ahead of the time $t_4$), similar to the foregoing, the diode 11c is made ON by the voltage Vc and the transistor 9c is made OFF with the result that its collector potential increases to make the transistor 5b ON. Thus, the transistors 3b and 4b are made ON to supply the driving current to the winding 2b.

As may be obvious from the above description, with the present invention the voltage Vb obtained from the winding 2b is used to supply the driving current to the winding 2a, the voltage Vc is used to supply the driving current to the winding 2b, and the voltage Va is used to supply the driving current to the winding 2c to rotate the rotor 6 of the motor 2.

The voltages Va, Vb, and Vc shown in FIG. 2 are obtained when the motor 2 is driven externally, but the driving currents are applied by the circuit shown in FIG. 1, so that the voltages can be illustrated as a current waveform as shown in FIG. 3, from a theoretical point of view. FIG. 3 shows the total current Ia which is fed to only one winding, for example, the winding 2a.

If the magnetic circuit of the motor 2 is used in saturation or nearly saturated condition in practical use, the mutual induction factors among the windings 2a, 2b and 2c become very small, and accordingly, voltages induced across the windings other than the one winding which is supplied with the driving current are very small and have no effect.

Figure 4:
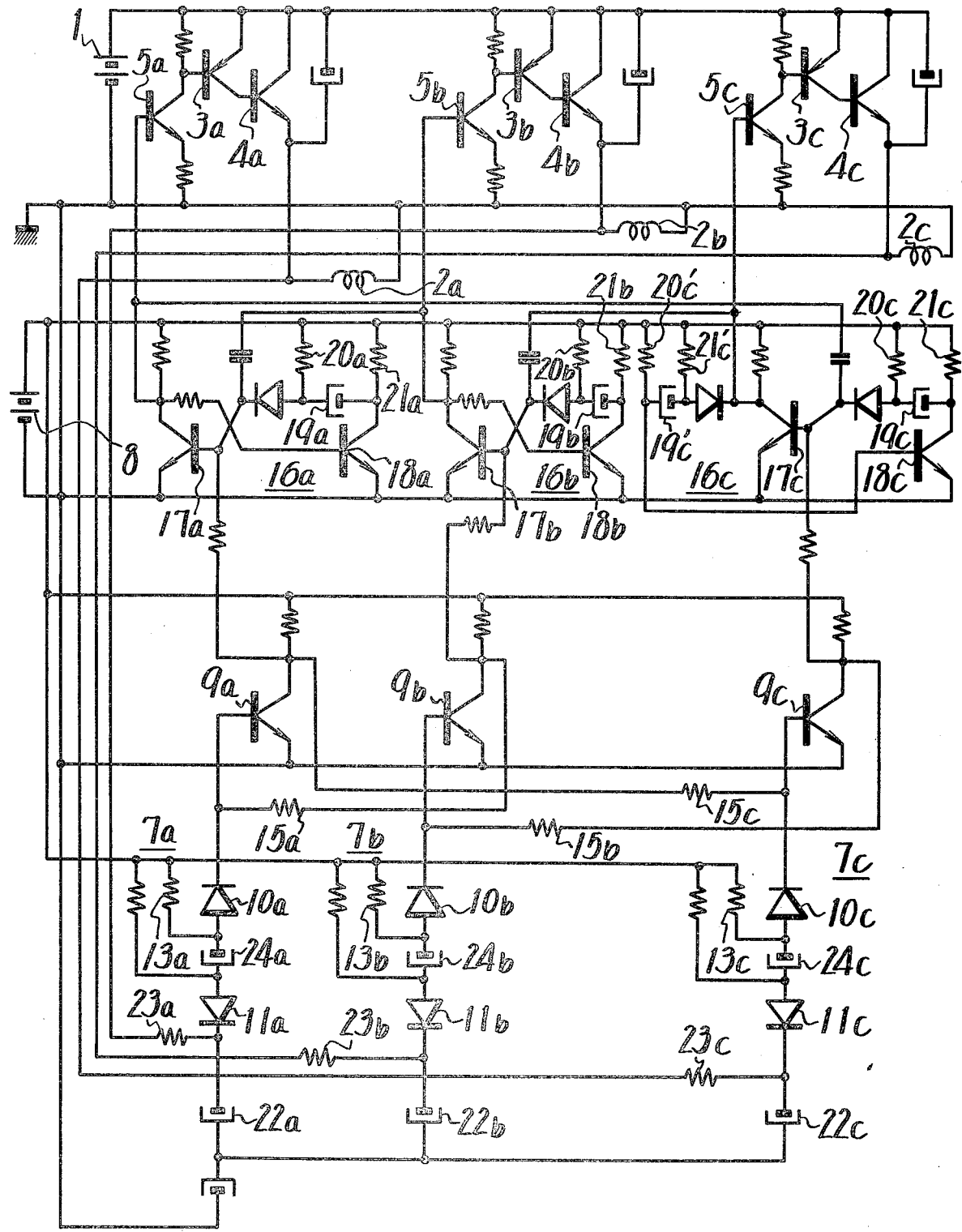
FIG. 4 is a connection diagram showing another embodiment of the present invention.

FIG. 4 shows another embodiment of the present invention in which reference numerals same as those of FIG. 1 indicate the same elements, so that their description will be omitted for the sake of brevity.

In the embodiment of FIG. 4, multivibrators 16a, 16b and 16c are provided for the windings 2a, 2b and 2c, respectively. In this case, the multivibrators 16a, 16b and 16c are connected in cascade to form a ring counter. When the motor is driven, the windings 2a, 2b and 2c are supplied with current through the multivibrators 16a, 16b and 16c, successively, in accordance with the operation of the ring counter to thereby rotate the motor 2. The multivibrators 16a, 16b, and 16c are formed of transistor pairs 17a, 18a; 17b, 18b; and 17c, 18c, respectively. In this case, the multivibrators 16a, 16b and 16c are so connected that the output of the multivibrator 16a is used to control the multivibrator 16c, the output of the multivibrator 16c is used to control the multivibrator 16b, and an output of the multivibrator 16b is used to control the multivibrator 16a to form a so-called ring counter. One of the multivibrator 16a, 16b and 16c, such for example, as the multivibrator 16c in the illustrated embodiment, is formed as an astable-multivibrator and the other or remaining multivibrators, that is, the multivibrators 16a and 16b are formed as monostable-multivibrators. Time intervals T (which will be referred to as the operation time interval for convenience's sake), within which the output terminals of the multivibrators 16a, 16b and 16c, that is, the collectors of the transistors 17a, 17b and 17c come to a high potential, are selected substantially equal to those of the respective multivibrators 16a, 16b and 16c. This can be achieved by selecting the time constants of time constant circuits substantially equal. These time constant circuits consist of capacitors 19a, 19b and 19c and pairs of resistors 20a, 21a; 20b, 21b; and 20c, 21c, respectively, for the multivibrators 16a, 16b and 16c. The time interval T' (which will be called the non-operation time period for the sake of convenience) except for the operation time interval T of the multivibrator 16c, is selected greater or longer than $(n - 1)T$ or to satisfy the condition of $(n - 1)T < T'$ where $n$ is the number of the windings 2a, 2b and 2c of the motor 2. This can be achieved by suitably selecting the time constant of the time constant circuit consisting of a capacitor 19'c and resistors 20'c and 21'c.

In the illustrated embodiment shown in FIG. 4, the output signals of the multivibrators 16a, 16b and 16c are applied to the bases of the transistors 5a, 5b and 5c, respectively, and the output signals of the transistors 9a and 9b and 9c are supplied to the bases of the transistors 17a, 17b and 17c, respectively.

The description will be now given on the operation of the embodiment shown in FIG. 4 with reference to FIGS. 5A, 5B and 5C. When the motor 2 is started or the circuit shown in FIG. 4 is supplied with power at a time $t_1$, the transistors 17a, 17b and nc of the multivibrators 16a, 16b and 16c which form the ring counter are made ON, respectively, to make their collector potentials zero. However, after the above mentioned non-operation time interval T' has lapsed, since the multivibrator 16c is an astable-multivibrator, it is put into the operation time interval T between times $t_2$ and $t_3$ (see FIG. 5C). Thus, the multivibrator 16c produces an output signal $S_c$. As a result, the transistors $5c$, $3c$ and $4c$ are made ON to supply the driving current to the winding $2c$ between times $t_2$ and $t_3$. At the time $t_3$ the base of the transistor $17b$ of the multivibrator $16b$ is made zero (or negative) with a differentiated pulse at the trailing edge of the signal $Sc$ and hence the transistor $17b$ is made OFF. Thus, the multivibrator $16b$ is put into the operaton time interval T between times $t_3$ and $t_4$ (see FIG. 5B) to produce an output signal $S_b$ which is applied to the base of the transistor $5b$ to make the same ON. Therefore, the transistors $3b$ and $4b$ are made ON to supply the driving current to the winding $2b$. Similarly, the multivibrator $16a$ is reversed with a trigger pulse of a differentiated pulse obtained at the trailing edge of the signal $S_b$. Thus, the multivibrator $16a$ produces between times $t_4$ and $t_5$ an output signal $S_a$ (see FIG. 5A) which is applied to the base of the transistor $5a$ to make the same ON. Thus, the transistors $3a$ and $4a$ are made ON to supply the driving current to the winding $2a$.

As described above, the multivibrators $16a$, $16b$ and $16c$ are operated successively, and accordingly, the windings $2a$, $2b$ and $2c$ are supplied with the driving currents successively to drive the motor 2.

When the motor 2 is started once, the logic circuits $7a$, $7b$ $7c$ are operated as described in connection with FIG. 1 and the transistors $17a$, $17b$ and $17c$ of the multivibrators $16a$, $16b$ and $16c$ are controlled with the output signals from the transistors $9a$, $9b$ and $9c$ to drive the motor 2 at the normal speed. Therefore, the multivibrators $16a$, $16b$ and $16c$ do not act as the ring counter. It may be preferred that the time interval T be selected longer than a time interval within which the driving currents are applied to the windings $2a$, $2b$ and $2c$ at the normal rotation speed of the motor 2.

In the embodiment of FIG. 4, circuits consisting of capacitors $22a$, $22b$, and $22c$ and resistors $23a$, $23b$, $23c$, form delay circuits for the signals and serve to make the time interval of the driving current for the winding $2a$ in an ideal state as shown in FIG. 3 by a dotted line $A''$. Further, capacitors $24a$, $24b$ and $24c$ of relatively large capacitance are inserted between the diodes $10a$ and $11a$, $10b$, and $11b$, $10c$ and $11c$, respectively, to form de-coupling means.

With the present invention described as above, rotary position detecting means for the rotor of the prior art brushless DC motor driving circuit, which is required in the prior art as described previously, is not required. This enables the construction of a simple brushless DC motor driving circuit. It also eliminates the need to adjust the attaching position of the detecting means.

It will be apparent that many modifications and variations could be effected by those skilled in the art without departing from the spirit and scope of the novel concepts of the present invention.

I claim as my invention:
1. A brushless DC motor driving circuit comprising:
   a. a DC motor having a rotor formed of a magnet and a stator having a plurality of star-connected fixed windings;
   b. a voltage source;
   c. a plurality of switching means, one being connected between an end of each fixed winding and the voltage source, said switching means having a control input;
   d. a plurality of position signal means, one being connected to the end of each fixed winding for detecting signals induced in said fixed winding by rotation of said rotor and providing a position signal; and
   e. a plurality of switching control circuits, one being connected to each of said position signal means, an output of said one switching control circuit being coupled to one of the position signal means different than the one connected to said one switching control circuit, said output also being coupled to one of said switching means control inputs.

2. The driving circuit of claim 1, in which each of said position signal means comprises diodes connected back-to-back.

3. The driving circuit of claim 2, in which each of said switching control circuits comprises a transistor inverter.

4. The driving circuit of claim 1 in which a monostable circuit means is provided between said switching means control inputs and connected switching control circuit outputs, an astable circuit means being provided between one of said switching means control inputs and connected switching control circuit output.

5. A brushless DC motor driving circuit comprising:
   a. a DC motor having a rotor formed of a magnet and a stator having a plurality of star connected fixed windings;
   b. a voltage source;
   c. switching means connected between an end of each fixed winding and the voltage source; said switching means having a control input;
   d. a logic circuit comprising two diodes connected to an end of each of said fixed windings;
   e. a switching control circuit connected to each of said logic circuits, an output of said switching control circuit being coupled to one of the logic circuits not connected to said switching control circuit, and also being connected to one of said switching means control inputs.

* * * * *